United States Patent [19]

Yoshioka et al.

[11] Patent Number: 4,761,063

[45] Date of Patent: Aug. 2, 1988

[54] PROJECTION LENS SYSTEM

[75] Inventors: Takayuki Yoshioka; Shinichi Hasegawa, both of Tokyo, Japan

[73] Assignee: Pioneer Electronic Corporation, Tokyo, Japan

[21] Appl. No.: 51,625

[22] Filed: May 20, 1987

[30] Foreign Application Priority Data

Dec. 2, 1986 [JP] Japan ................................. 61-285986

[51] Int. Cl.⁴ .......................... G02B 27/18; G02B 9/60
[52] U.S. Cl. ..................................... 350/432; 350/412
[58] Field of Search ....................... 350/432, 465, 412

[56]  References Cited

U.S. PATENT DOCUMENTS 4,691,996  9/1987  Cho ...................................... 350/432

FOREIGN PATENT DOCUMENTS 60-175019  9/1985  Japan .

Primary Examiner—John K. Corbin
Assistant Examiner—Rebecca D. Gass
Attorney, Agent, or Firm—Finnegan, Henderson Farabow, Garrett, and Dunner

[57]  ABSTRACT

A projection lens system is disclosed which comprises in order from a screen side, a first lens unit having a positive focal length, a second lens unit having a negative focal length, a third lens unit having a positive focal length, a fourth lens unit having a positive focal length and a fifth lens unit having a negative focal length and a concave surface directed toward the screen side. The first and second lens units being made of plastic. At least one of lens surfaces of the first and second lens unit is aspherical. At least one of lens surfaces of the third and fourth lens units is aspherical. The fifth lens unit is made of plastic and at least one of lens surfaces of the fifth lens unit is aspherical.

1 Claim, 4 Drawing Sheets

PROJECTION LENS SYSTEM

BACKGROUND OF THE INVENTION

This invention relates to a projection lens system used in projection television or the like.

In the projection television, red, green and blue pictures formed on CRTs (cathode ray tubes) are projected respectively through three projection lenses on the screen to form a large color picture thereon. In order to reduce the size of such a projection television system or to miniaturize the latter, it is essential to use the projection lens which is large both in picture angle and in aperture ratio and excellent in image forming performance.

A variety of projection lenses have been proposed in the art in order to satisfy the above-described requirement.

In one example of the conventional projection lenses, only glass lenses are employed because they can be manufactured with high accuracy to form a high quality projection lens. In another example, only plastic lenses are used in order to reduce the manufacturing cost and to have a large aperture ratio. In another example, glass lenses and plastic lenses with aspherical surfaces are employed in combination.

Furthermore, in a projection television system as disclosed by Japanese Patent Application (OPI) No. 175019/85, in order to compensate the curvature of field to thereby maintain the image forming performance high, the surface of the picture plate of the CRT is made aspherical.

However, the conventional projection lens system comprising glass lenses suffers from the following difficulties: The improvement of the image forming performance with the large aperture ratio maintained unchanged results in an increase of the manufacturing cost and greatly lowers the marginal characteristic. The projection lens made up of three plastic lens elements with aspherical surfaces is suitable for obtaining a large aperture ratio; however, it is still disadvantageous in that, with the coma aberration taken into consideration, it is difficult to improve the image forming performance. In addition, the plastic lens is disadvantageous in that the refractive index, the configuration and the focal length change with temperature, i.e., the image forming performance changes with temperature. In the projection television system described above in which the surface of the picture plate of the CRT is made aspherical, the CRT used is limited, and therefore the projection lens for the CRT thus limited cannot be used for other CRTs.

SUMMARY OF THE INVENTION

Accordingly, an object of this invention is to provide a projection lens in which the above-described difficulties accompanying a conventional projection lens have been eliminated, and which is large both in aperture ratio and in picture angle and excellent in image forming performance.

According to the present invention, there is provided a projection lens system comprising: in order from a screen side, a first lens unit having a positive focal length, a second lens unit having a negative focal length, a third lens unit having a positive focal length, a fourth lens unit having a positive focal length and a fifth lens unit having a negative focal length and a concave surface directed toward the screen side, said first and second lens units being made of plastic, at least one of lens surfaces of said first and second lens unit being aspherical, at least one of lens surfaces of said third and fourth lens units being aspherical, said fifth lens unit being made of plastic and at least one of lens surfaces of said fifth lens unit being aspherical, said system meeting the following conditions:

(1) $0.29f < |r_9| < 0.5f$
(2) $0.2 < \psi_1 < 0.6$
(3) $-0.6 < \psi_2 < -0.2$
(4) $0.7 < \psi_3 < 1.2$
(5) $\nu_2 < \nu_1$, $\nu_2 < \nu_3$
(6) $(dN/dT)_1 > (dN/dT)_2$ where f is the overall focal length of said lens system;
$r_9$ is the radius of curvature of a screen-side lens surface of said fifth lens unit;
$\psi_1$ is the refractive power of the first lens unit;
$\psi_2$ is the refractive power of the second lens unit;
$\psi_3$ is the refractive power of the third lens unit;
$\nu_1$ is the Abbe number of the first lens unit;
$\nu_2$ is the Abbe number of the second lens unit;
$\nu_3$ is the Abbe number of the third lens unit;
$(dN/dT)_1$ is the variation of refractive index with temperature of the first lens unit; and
$(dN/dT)_2$ is the variation of refractive index with temperature of the second lens unit. The overall refractive power of the lens system is expressed as a unit 1.

DETAILED DESCRIPTION OF THE PREFERRED EMBODIMENTS

Figure 1:
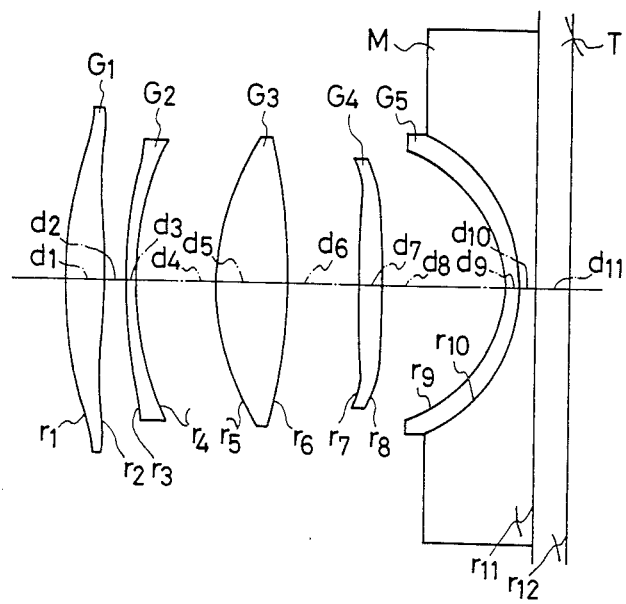
FIG. 1 is a cross-sectional view showing a structure in accordance with examples of the present invention.

In the projection lens of the invention, a third lens unit and the first and fourth lens units which are plastic lenses provide a positive power, the first and fourth lens units compensate for the coma aberration and the spherical aberration, and a fifth lens unit is a concave lens whose concave surface faces the screen. In the fifth lens unit, at least one surface is made aspherical to compensate for astigmatism and distortion, and Petzval's sum is made small to correct the curvature of field.

One of the specific features of the invention resides in that the fourth lens unit compensates for the marginal coma aberration mainly, and the astigmatism also which cannot be compensated by the fifth lens unit.

Both the second lens unit which is a negative lens of plastic at least one surface of which is aspherical and the above-described first lens unit act to cancel out the variations of refractive index with temperature thereof, to thereby decrease the positional variation of focal point with temperature, and the second lens unit is used to compensate for chromatic aberrations that are generated in the first and third lens units.

The condition (1) for the projection lens to achieve the object of the invention concerns the radius $r_9$ of curvature of the surface of the fifth lens unit which surface is on the screen side, and it is the condition for maintaining the Petzval's sum satisfactory. If the radius of curvature would exceed the lower limit, then the Petzval's sum would become excessively small, so that the curvature of field would be excessively corrected. If, on the other hand, the radius of curvature would exceed the upper limit, then the Petzval's sum would become excessively large, so that the curvature of field could not be sufficiently corrected.

The condition (2) concerns a power of the first lens unit. If the power would exceed the lower limit, then the powers of the third and fourth lens units must be increased. As a result, the spherical aberration is increased, which makes it difficult to increase a diameter of the lens unit. If the power would exceed the upper limit, then the off-axis aberration would become worse, which obstructs the provision of a wide angle function. At the same time, the lens thickness is increased. In particular, if the first lens is made of plastic, the moldability of the lens will be worse.

The condition (3) concerns a power of the second lens unit. If the power would exceed the lower limit, then it would be necessary to increase the thickness of the first lens unit to increase the power. Therefore, in this case, it is difficult to manufacture the first lens unit. because of the increase in thickness of the lens. If the power would exceed the upper limit, the correction for temperature change could not be made sufficiently.

The condition (4) concerns a power of the third lens unit. If the power would exceed the lower limit, then it would be necessary to increase the thickness of the fourth lens unit to thereby increase the power. Therefore, in this case, it is difficult to form the fourth lens unit of plastic by using a mold. If the power would exceed the upper limit, then the spherical aberration would increase, which would make it difficult to increase a diameter of the fourth lens unit.

The condition (5) relates to Abbe numbers of the first, second and third lens units, and is necessary to compensate for a chromatic aberration. Namely, the second lens unit that is a concave lens is made of material having a small Abbe number, and the first and third lens units that are convex lenses are made of material having large Abbe numbers, thus meeting the conditions.

To meet these conditions, offsets of the image forming planes due to a difference in wavelength of light may be eliminated, so that it is possible to well compensate for the chromatic aberration.

The condition (6) concerns variation factors of refractive index with temperature of the first and second lens units; that is, it is to compensate for the variation of focal length with temperature. If the first lens unit which is a convex lens is made of the material whose variation factor $(dN/dT)_1$ is smaller in its absolute value and the second lens unit which is a concave lens is made of the material whose variation factor $(dN/dT)_2$ is larger in its absolute value to meet the condition: $(dN/dT)_2 > (dN/dT)_2$, then these lenses act to cancel out the shift of the image forming planes, and therefore the lowering of the performance can be minimized when the temperature changes.

If the third group lens is of glass, then its performance is scarcely affected by temperature change. The fourth lens unit and the fifth lens unit are close to the picture plate of the CRT, and, of the light beams from the picture plate of the CRT, the one which passes through the inlet pupil is small in section at the fourth and fifth lens units. Therefore, it is unnecessary to compensate these lenses for temperature variation.

In the following description, $r_1, r_2, \ldots$ designate the radii of curvature of the surfaces of the lenses, $d_1, d_2, \ldots$ the thicknesses of the lenses on the optical axis or the air distances between adjacent lenses on the optical axis, and $N_1, N_2, \ldots$ the refractive indexes of the lenses with respect to the light of a line e.

The configuration of the aspherical surface is the rotationally symmetric aspherical surface which can be represented by the following expressions in the rectilinear coordinate system with the optical axis and the X-axis:

$$X = \frac{H/r}{1 + \sqrt{1 - (k+1)(H/r)^2}} + A_4 H^4 + A_6 H^6 + A_8 H^8 + A_{10} H^{10}$$

$$H = \sqrt{Y^2 + Z^2}$$

where r is the paraxial curvature of the vertex, k is the conic constant, and $A_4, A_6, A_8$ and $A_{10}$ are the high order aspherical constants.

Employment of the projection lens according to the invention permits a reduction of Petzval's sum to be capable of making the picture plate of the CRT flat. Therefore, in each of the examples of the projection lens, the radius of curvature $r_{11}$ of the surface of the picture plate of the CRT and the radius of curvature $r_{12}$ of the fluorescent surface of the same may be set to infinity.

FIG. 1 is a sectional view showing a projection lens system according to Example 1 to 3. In these examples, the first lens unit $G_1$, the fourth lens unit $G_4$, and the fifth lens unit $G_5$ are acrylic lenses, the second lens unit $G_2$ is a polystyrene lens, and the third lens unit $G_3$ is a glass lens. The variation factors of refractive index with temperature of the first lens unit and the second lens unit are as follows:

$(dN/dT)_1 = -1.2 \times 10^{-4}$ $(dN/dT)_2 = -1.4 \times 10^{-4}$

The picture plate of the CRT is coupled to the fifth lens unit $G_5$ through a liquid-phase or gel-phase filter M which serves to prevent the lowering of contrast which otherwise may be caused by reflection at the picture plate and to cool the CRT and which has a refractive index of more then 1.35.

In each of the examples of the projection lens according to the invention, s was described above the space between the fifth lens unit and the picture plate T of the CRT is filled with the liquid-phase or gel-phase filler in order to prevent the lowering of contrast which other wise may be caused by reflection at the surface of the picture plate; however, it is not always required to do so. That is, a method may be employed in which the surface of the fifth lens unit which is on the side of the CRT is made substantially flat, and air is employed as the medium between the picture plate T of the CRT and the fifth lens unit.

Figure 2:
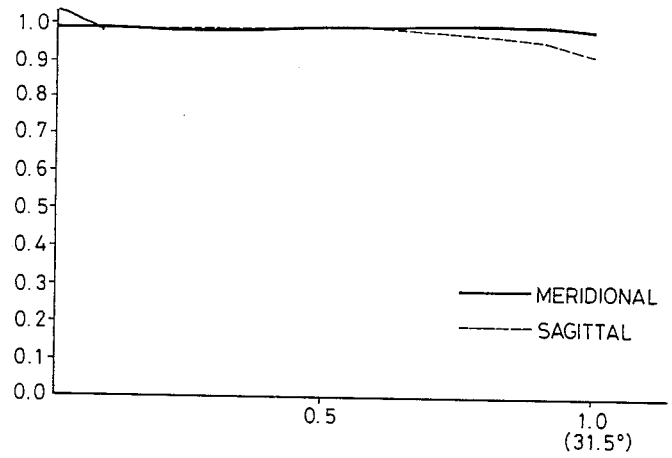
FIGS. 2, 5 and 8 are graphs showing OTFs (optical transfer functions) of Examples 1, 2 and 3 of the invention, respectively.
Figure 3:
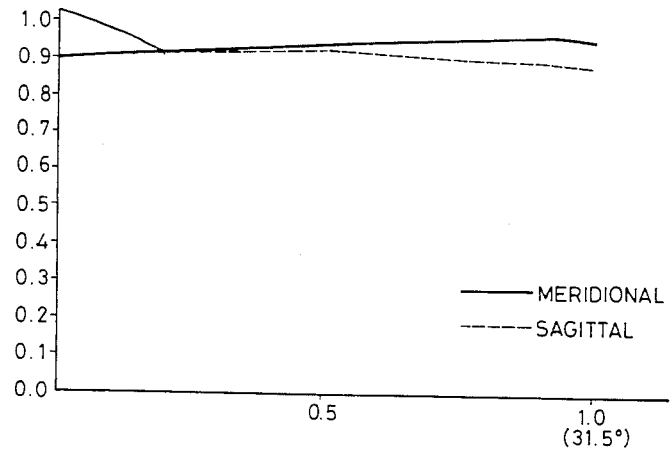
FIGS. 3, 6 and 9 are graphs showing OTFs with weight of green light taken into account in Examples 1, 2 and 3, respectively.
Figure 4:
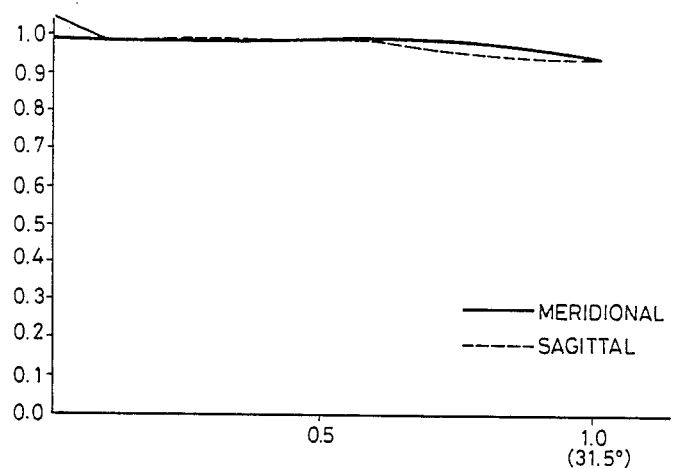
FIGS. 4, 7 and 10 are graphs showing OTFs with temperature of Examples 1, 2 and 3 of the invention, respectively.
Figure 5:
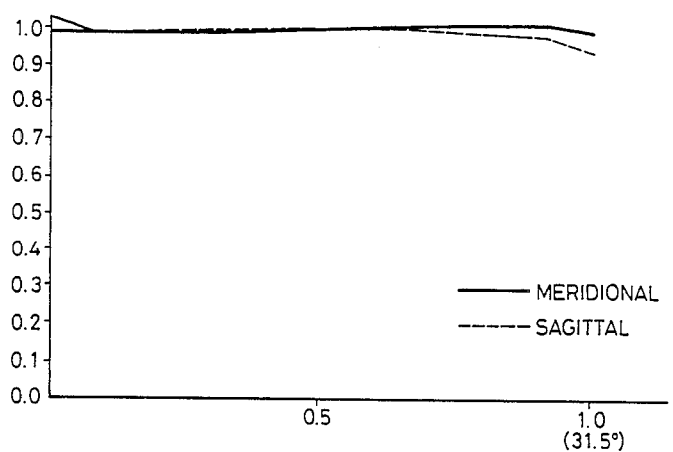
Figure 6:
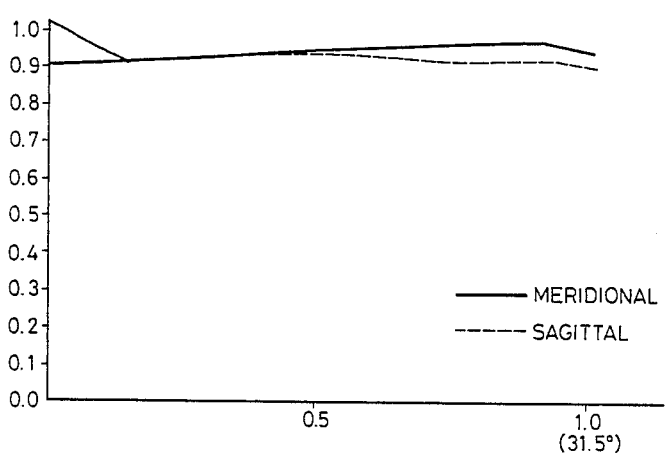
Figure 7:
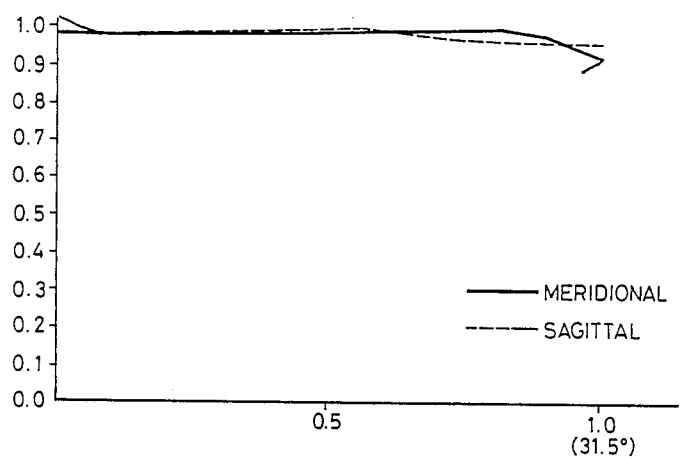
Figure 8:
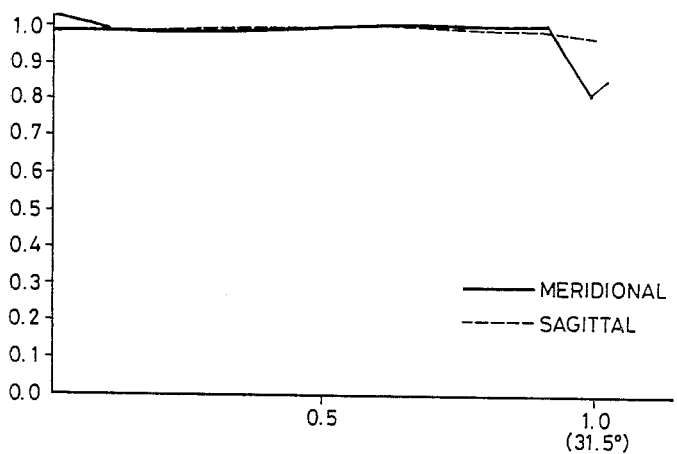
Figure 9:
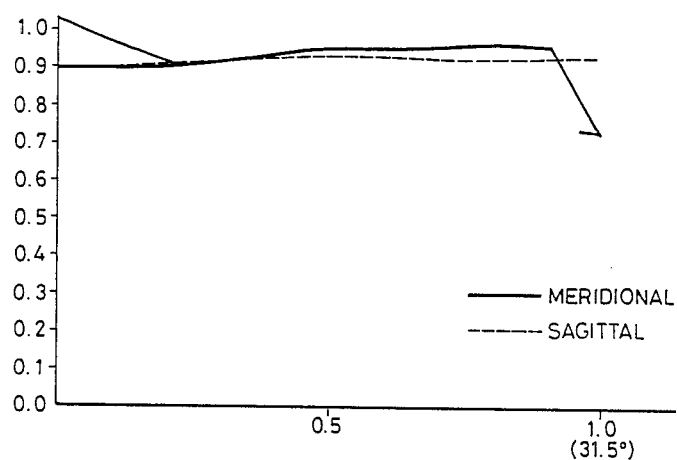
Figure 10:
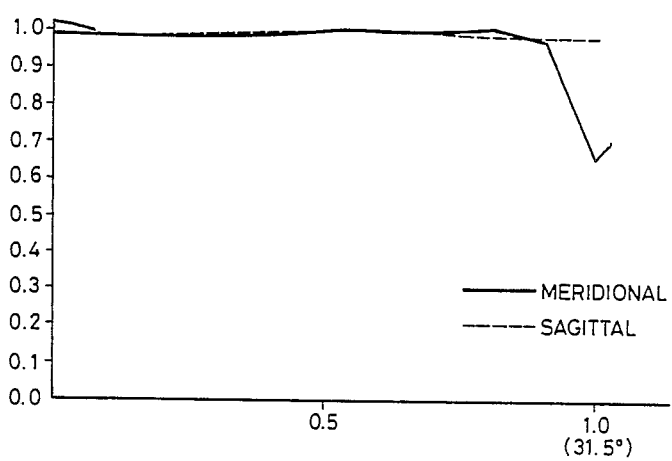

FIG. 2 indicates an OTF (optical transfer function) with monochromatic light in Example 1. FIG. 3 is a graph showing an OtF with respect to a green light having the components shown in the following table. FIG. 4 is also a graphical representation indicating OTF in the case where the temperature is made higher by 20° than that in the above-described case of the monochromatic light, in Example 1.

| Wavelength | Intensity Ratio |
|---|---|
| 490 nm | 0.14 |
| 520 nm | 0.19 |
| 545 nm | 0.44 |
| 555 nm | 0.17 |
| 600 nm | 0.06 |

In the aforementioned graphical representations, the meridional characteristics and the sagittal characteristics are shown with the solid lines and the broken lines, respectively. With respect to Examples 2 and 3, the like graphs are also shown in FIGS. 4 to 10.

As is apparent from the above-described graphical representation, the invention can realize the projection lens in which, although its aperture ratio is large with an "F" number of 1.0, with respect to half a view angle of 31.5° not only the conventional aberration correction is achieved but also the variation of refractive index with temperature of the plastic lens is sufficiently compensated. Also the chromatic aberration is well corrected. The projection lens provided according to the invention is excellent in image formation characteristic. Because of the above-described fact, the projection lens of the invention can effectively employ the plastic lenses. Therefore, the projection lens of the invention can be readily manufactured and its manufacturing cost can be reduced. Furthermore the projection lens in which the chromatic aberration is also corrected can be provided.

As was described above, the invention can provide the projection lens excellent in image-forming performance and low in manufacturing cost in which, in spite of its large aperture ratio and large picture angle, not only the chromatic aberration correction is achieved but also the variation of focal distance with temperature is sufficiently compensated for.

EXAMPLE 1 focal length = 86.17   aperture ratio 1:1.0

| | | | |
|---|---|---|---|
| $r_1 = 102.299$ | | | |
| | $d_1 = 10.000$ | $N_1 = 1.492$ | $\nu_1 = 58.200$ |
| $r_2 = 824.017$ | | | |
| | $d_2 = 9.329$ | | |
| $r_3 = 182.112$ | | | |
| | $d_3 = 4.000$ | $N_2 = 1.596$ | $\nu_2 = 30.800$ |
| $r_4 = 93.989$ | | | |
| | $d_4 = 19.980$ | | |
| $r_5 = 70.319$ | | | |
| | $d_5 = 22.626$ | $N_3 = 1.519$ | $\nu_3 = 64.200$ |
| $r_6 = -182.116$ | | | |
| | $d_6 = 22.029$ | | |
| $r_7 = 209.252$ | | | |
| | $d_7 = 9.036$ | $N_4 = 1.492$ | $\nu_4 = 58.200$ |
| $r_8 = -411.168$ | | | |
| | $d_8 = 37.000$ | | |
| $r_9 = -31.637$ | | | |
| | $d_9 = 4.000$ | $N_5 = 1.491$ | $\nu_5 = 58.200$ |
| $r_{10} = -48.000$ | | | |
| | $d_{10} = 5.000$ | $N_6 = 1.438$ | $\nu_6 = 63.800$ |
| $r_{11} = \infty$ | | | |
| | $d_{11} = 10.300$ | $N_7 = 1.542$ | $\nu_7 = 55.000$ |
| $r_{12} = \infty$ | | | |

| $r_1$: aspherical surface | $r_2$: aspherical surface |
|---|---|
| k: $-0.1006 \times 10$ | 0.000 |
| $A_4$: $-0.2540 \times 10^{-6}$ | $0.5209 \times 10^{-6}$ |
| $A_6$: $0.1788 \times 10^{-9}$ | $0.9383 \times 10^{-10}$ |
| $A_8$: $-0.3514 \times 10^{-13}$ | $-0.4152 \times 10^{-13}$ |
| $A_{10}$: $-0.2178 \times 10^{-17}$ | $-0.1987 \times 10^{-17}$ |
| $r_3$: aspherical surface | $r_4$: aspherical surface |
| k: 0.000 | 0.000 |
| $A_4$: $-0.5173 \times 10^{-6}$ | $-0.1004 \times 10^{-5}$ |
| $A_6$: $-0.3610 \times 10^{-9}$ | $-0.3910 \times 10^{-9}$ |
| $A_8$: $0.7188 \times 10^{-13}$ | $0.1999 \times 10^{-12}$ |
| $A_{10}$: $0.2120 \times 10^{-18}$ | $-0.2112 \times 10^{-16}$ |
| $r_7$: aspherical surface | $r_6$: aspherical surface |
| k: 0.000 | 0.000 |
| $A_4$: $-0.1031 \times 10^{-6}$ | $0.3907 \times 10^{-6}$ |
| $A_6$: $-0.1391 \times 10^{-8}$ | $-0.1024 \times 10^{-8}$ |
| $A_8$: $0.7939 \times 10^{-12}$ | $0.1928 \times 10^{-12}$ |
| $A_{10}$: $-0.8641 \times 10^{-15}$ | $-0.4734 \times 10^{-15}$ |
| $r_9$: aspherical surface | |
| k: $-0.1000 \times 10$ | |
| $A_4$: $0.1727 \times 10^{-6}$ | |
| $A_6$: $-0.2407 \times 10^{-8}$ | |
| $A_8$: $0.1528 \times 10^{-11}$ | |
| $A_{10}$: $-0.6997 \times 10^{-15}$ | |

EXAMPLE 2 focal length = 86.32   aperture ratio 1:1.0

| | | | |
|---|---|---|---|
| $r_1 = 110.675$ | | | |
| | $d_1 = 10.898$ | $N_1 = 1.492$ | $\nu_1 = 58.200$ |
| $r_2 = -665.404$ | | | |
| | $d_2 = 8.641$ | | |
| $r_3 = 159.921$ | | | |
| | $d_3 = 3.000$ | $N_2 = 1.596$ | $\nu_2 = 30.800$ |
| $r_4 = 78.401$ | | | |
| | $d_4 = 22.630$ | | |
| $r_5 = 70.461$ | | | |
| | $d_5 = 21.899$ | $N_3 = 1.519$ | $\nu_3 = 64.200$ |
| $r_6 = -185.694$ | | | |
| | $d_6 = 21.774$ | | |
| $r_7 = 229.770$ | | | |
| | $d_7 = 8.158$ | $N_4 = 1.492$ | $\nu_4 = 58.200$ |
| $r_8 = -365.170$ | | | |
| | $d_8 = 37.000$ | | |
| $r_9 = -31.735$ | | | |
| | $d_9 = 4.000$ | $N_5 = 1.491$ | $\nu_5 = 58.200$ |
| $r_{10} = -48.000$ | | | |
| | $d_{10} = 5.000$ | $N_6 = 1.438$ | $\nu_6 = 63.800$ |
| $r_{11} = \infty$ | | | |
| | $d_{11} = 10.300$ | $N_7 = 1.542$ | $\nu_7 = 55.000$ |
| $r_{12} = \infty$ | | | |

| $r_1$: aspherical surface | $r_2$: aspherical surface |
|---|---|
| k: $-0.1006 \times 10$ | 0.000 |
| $A_4$: $-0.6157 \times 10^{-6}$ | $0.6057 \times 10^{-6}$ |
| $A_6$: $0.1706 \times 10^{-9}$ | $-0.3946 \times 10^{-10}$ |
| $A_8$: $-0.5978 \times 10^{-13}$ | $-0.6124 \times 10^{-13}$ |
| $A_{10}$: $-0.1401 \times 10^{-16}$ | $-0.6421 \times 10^{-17}$ |
| $r_3$: aspherical surface | $r_4$: aspherical surface |
| k: 0.000 | 0.000 |
| $A_4$: $-0.5906 \times 10^{-7}$ | $-0.1031 \times 10^{-5}$ |
| $A_6$: $-0.4229 \times 10^{-9}$ | $-0.3683 \times 10^{-9}$ |
| $A_8$: $0.3770 \times 10^{-13}$ | $0.1530 \times 10^{-12}$ |
| $A_{10}$: $0.9948 \times 10^{-17}$ | $-0.1536 \times 10^{-16}$ |
| $r_7$: aspherical surface | $r_8$: aspherical surface |
| k: 0.000 | 0.000 |
| $A_4$: $-0.7429 \times 10^{-8}$ | $0.5110 \times 10^{-6}$ |
| $A_6$: $-0.1315 \times 10^{-8}$ | $-0.1012 \times 10^{-8}$ |
| $A_8$: $0.8187 \times 10^{-12}$ | $0.2921 \times 10^{-12}$ |
| $A_{10}$: $-0.9203 \times 10^{-15}$ | $-0.5759 \times 10^{-15}$ |
| $r_9$: aspherical surface | |
| k: $-0.1000 \times 10$ | |
| $A_4$: $0.3271 \times 10^{-6}$ | |
| $A_6$: $-0.2862 \times 10^{-8}$ | |
| $A_8$: $0.2012 \times 10^{-11}$ | |
| $A_{10}$: $-0.8800 \times 10^{-15}$ | |

EXAMPLE 3

| focal length = 86.39 | aperture ratio 1:1.0 | | |
|---|---|---|---|
| $r_1 = 129.014$ | | | |
| | $d_1 = 11.000$ | $N_1 = 1.492$ | $\nu_1 = 58.200$ |
| $r_2 = -185.983$ | | | |
| | $d_2 = 6.286$ | | |
| $r_3 = 312.244$ | | | |
| | $d_3 = 3.000$ | $N_2 = 1.596$ | $\nu_2 = 30.800$ |
| $r_4 = 91.275$ | | | |
| | $d_4 = 27.423$ | | |
| $r_5 = 72.220$ | | | |
| | $d_5 = 21.271$ | $N_3 = 1.519$ | $\nu_3 = 64.200$ |
| $r_6 = -179.623$ | | | |
| | $d_6 = 21.411$ | | |
| $r_7 = 343.591$ | | | |
| | $d_7 = 6.609$ | $N_4 = 1.492$ | $\nu_4 = 58.200$ |
| $r_8 = -313.070$ | | | |
| | $d_8 = 37.000$ | | |
| $r_9 = -31.873$ | | | |
| | $d_9 = 4.000$ | $N_5 = 1.491$ | $\nu_5 = 58.200$ |
| $r_{10} = -48.000$ | | | |
| | $d_{10} = 5.000$ | $N_6 = 1.438$ | $\nu_6 = 63.800$ |
| $r_{11} = \infty$ | | | |
| | $d_{11} = 10.300$ | $N_7 = 1.542$ | $\nu_7 = 55.000$ |
| $r_{12} = \infty$ | | | |

| $r_1$: aspherical surface | | $r_2$: aspherical surface | |
|---|---|---|---|
| k: | $-0.1006 \times 10$ | | 0.000 |
| $A_4$: | $-0.9464 \times 10^{-6}$ | | $0.2212 \times 10^{-5}$ |
| $A_6$: | $0.8100 \times 10^{-9}$ | | $-0.3631 \times 10^{-9}$ |
| $A_8$: | $-0.2905 \times 10^{-12}$ | | $-0.1130 \times 10^{-12}$ |
| $A_{10}$: | $0.7635 \times 10^{-17}$ | | $0.7683 \times 10^{-17}$ |
| $r_3$: aspherical surface | | $r_4$: aspherical surface | |
| k: | 0.000 | | 0.000 |
| $A_4$: | $0.3870 \times 10^{-5}$ | | $0.1382 \times 10^{-5}$ |
| $A_6$: | $-0.3185 \times 10^{-8}$ | | $-0.2376 \times 10^{-8}$ |
| $A_8$: | $0.8070 \times 10^{-12}$ | | $0.7996 \times 10^{-12}$ |
| $A_{10}$: | $-0.6082 \times 10^{-16}$ | | $-0.8130 \times 10^{-16}$ |
| $r_7$: aspherical surface | | $r_8$: aspherical surface | |
| k: | 0.000 | | 0.000 |
| $A_4$: | $-0.1249 \times 10^{-7}$ | | $0.5111 \times 10^{-6}$ |
| $A_6$: | $-0.1552 \times 10^{-8}$ | | $-0.1346 \times 10^{-8}$ |
| $A_8$: | $0.1025 \times 10^{-11}$ | | $0.7013 \times 10^{-12}$ |
| $A_{10}$: | $-0.9037 \times 10^{-15}$ | | $-0.6797 \times 10^{-15}$ |
| $r_9$: aspherical surface | | | |
| k: | $-0.1000 \times 10$ | | |
| $A_4$: | $0.6202 \times 10^{-6}$ | | |
| $A_6$: | $-0.3808 \times 10^{-8}$ | | |
| $A_8$: | $0.3019 \times 10^{-11}$ | | |
| $A_{10}$: | $-0.1197 \times 10^{-14}$ | | |

We claim:

1. A projection lens system comprising: in order from a screen side, a first lens unit having a positive focal length, a second lens unit having a negative focal length, a third lens unit having a positive focal length, a fourth lens unit having a positive focal length and a fifth lens unit having a negative focal length and a concave surface directed toward the screen side, and said first and second lens units being made of plastic, at least one of the lens surfaces of said first and second lens unit being aspherical, at least one of the lens surfaces of said third and fourth lens units being aspherical, said fifth lens unit being made of plastic and at least one of the lens surfaces of said fifth lens unit being aspherical, said system meeting the following conditions:

(1) $0.29f < |r_9| < 0.5f$
(2) $0.2 < \psi_1 < 0.6$
(3) $-0.6 < \psi_2 < -0.2$
(4) $0.7 < \psi_3 < 1.2$
(5) $\nu_2 < \nu_1$, $\nu_2 < \nu_3$
(6) $(dN/dT)_1 > (dN/dT)_2$ where f is the overall focal length of said lens sytem;
$r_9$ is the radius of curvature of a screen-side lens surface of said fifth lens unit;
$\psi_1$ is the refractive power of the first lens unit;
$\psi_2$ is the refractive power of the second lens unit;
$\psi_3$ is the refractive power of the third lens unit;
$\nu_1$ is the Abbe number of the first lens unit;
$\nu_2$ is the Abbe number of the second lens unit;
$\nu_3$ is the Abbe number of the third lens unit;
$(dN/dT)_1$ is the variation of refractive index with temperature of said first lens unit; and
$(dN/dT)_2$ is the variation of refractive index with temperature of said second lens unit;
an overall refractive power $\psi$ of said lens system being expressed as a unit 1.

* * * * *